(12) United States Patent
Abbasi et al.

(10) Patent No.: US 7,038,770 B2
(45) Date of Patent: May 2, 2006

(54) VIRTUAL-TIGHT-WIRE SYSTEM FOR ASSEMBLY AND REPAIR OF ROTARY MACHINERY

(75) Inventors: Waheed A. Abbasi, Murrysville, PA (US); Wilbert B. Rethage, Apollo, PA (US)

(73) Assignee: Siemens Power Generation, Inc., Orlando, FL (US)

( * ) Notice: Subject to any disclaimer, the term of this patent is extended or adjusted under 35 U.S.C. 154(b) by 216 days.

(21) Appl. No.: 10/671,256

(22) Filed: Sep. 25, 2003

(65) Prior Publication Data

US 2005/0068521 A1 Mar. 31, 2005

(51) Int. Cl.
*G01B 11/26* (2006.01)
*G01C 3/00* (2006.01)

(52) U.S. Cl. .................... 356/138; 356/139.05; 33/278

(58) Field of Classification Search ................ 356/138, 356/139.04, 139.05; 33/227, 278, 279, 286, 33/542

See application file for complete search history.

(56) References Cited

U.S. PATENT DOCUMENTS 4,521,968 A * 6/1985 Wiltermood et al. ......... 33/542
5,359,781 A * 11/1994 Melville ...................... 33/286

* cited by examiner

*Primary Examiner*—Samuel A. Turner
*Assistant Examiner*—Roy M. Punnoose

(57) ABSTRACT

A virtual-tight-wire system is provided for determining a centerline in a large rotary machine (10). The virtual-tight-wire system includes a columnar light source (30) that is positioned at one end of the rotary machine (10). A columnar beam of light (32) is emitted from the light source (30) toward light receivers (26) in a first and second centering tool (24). The beam of light (32) is adjusted to impact the center of the light receivers (26). Once the beam (32) has been aligned, the beam acts as a virtual tight-wire for identifying a centerline of the rotary machine (10).

16 Claims, 4 Drawing Sheets

VIRTUAL-TIGHT-WIRE SYSTEM FOR ASSEMBLY AND REPAIR OF ROTARY MACHINERY

FIELD OF THE INVENTION

The present invention relates to methods and systems for establishing a centerline and, more particularly to methods and systems that utilize a virtual tight-wire in the assembly and/or repair of a large rotary machine.

BACKGROUND

To assemble or repair large rotary machinery, such as steam turbines, combustion turbines or power generators, it is often necessary to precisely locate a centerline in the machine. Conventional methods for locating a centerline involve the use of a tight-wire. A tight-wire is a steel wire that is strung tightly between two ends of a rotary machine. The wire is stretched across the length of the machine and is then precisely centered at each end to establish the centerline.

Establishing a centerline using conventional tight-wire procedures is labor-intensive and is prone to human error. Positioning a tight-wire at the two ends of a rotary machine requires a large number of measurements and adjustments. The measurements and adjustments must be made in a repetitive and iterative manner to zero in on the centerline. The accuracy of the results are highly dependent upon the operator's expertise. Various adjustment data from wire-sag tables must also be taken into account in order to compensate for the natural sag of the tight-wire.

Another significant problem with conventional tight-wires is the fact that the tight-wire obstructs the internals of a machine during an assembly or repair. While the tight-wire is in place, it is not possible for many other operations to be performed. In industries, like the power generation industry, where every hour of an outage can result in tens of thousands of dollars of lost revenue, this problem is significant. In such industries, it is critical that assembly and repair operations be carefully timed and coordinated to use every available hour of an outage effectively.

SUMMARY OF THE INVENTION

With the foregoing in mind, methods and systems consistent with the present invention utilize a virtual tight-wire to determine a centerline in a large rotary machine. The virtual tight-wire is not obstructive and does not interfere with other operations that may need to be performed during a repair or assembly.

A columnar light source, such as a laser emitter, is positioned at one end of a rotary machine. Centering tools containing light receivers are placed on a reference cylindrical surface at opposite ends of the rotary machine. A columnar beam of light is emitted from the light source towards the light receivers. The beam of light is adjusted until it is aligned with the light receivers in each centering tool. This establishes the centerline with respect to the reference surfaces. The beam of light than acts as virtual tight-wire for identifying the centerline over the length of the rotary machine.

These and other objects, features, and advantages in accordance with the present invention are provided in one aspect by a system for establishing a centerline in a rotary machine relative to a first and second reference surface. The system comprises (a) a light source for emitting a columnar beam of light; (b) a support structure for fixedly supporting the light source relative to the rotary machine; (c) a first centering tool having a pass-through light receiver disposed at one end of the centering tool at a position such that the center of the receiver lies at the center of the first reference surface when an opposite end of the centering tool is positioned to abut the first reference surface; (d) a second centering tool having a light receiver disposed at one end of the centering tool at a position such that the center of the receiver lies at the center of the second reference surface when an opposite end of the centering tool is positioned to abut the second reference surface; and (e) an adjustment mechanism on the support structure for adjusting the position of the light source in at least a horizontal and vertical direction and for aligning the beam of light to impact the center of the light receivers in the first and second centering tool.

In another aspect, the present invention comprises a method for determining a centerline in a rotary machine. The method comprises the steps of (a) positioning a light source at a first end of said rotary machine near the center of a first curved reference surface; (b) positioning a first and second centering tool on the first and second curved reference surface, the first and second centering tool having a light receiver at a distal end of the centering tool at a position such that the center of the light receiver corresponds with the center of the curved reference surfaces; (c) emitting a beam of light from the light source toward the first and second centering tools; (d) adjusting the position of the light source so that the beam passes through the center of the light receivers in the first and second centering tool; and (e) fixing the position of the light source to indicate the centerline.

BRIEF DESCRIPTION OF THE DRAWINGS

The invention is explained by way of example with reference to the following drawings.

DETAILED DESCRIPTION

Figure 1:
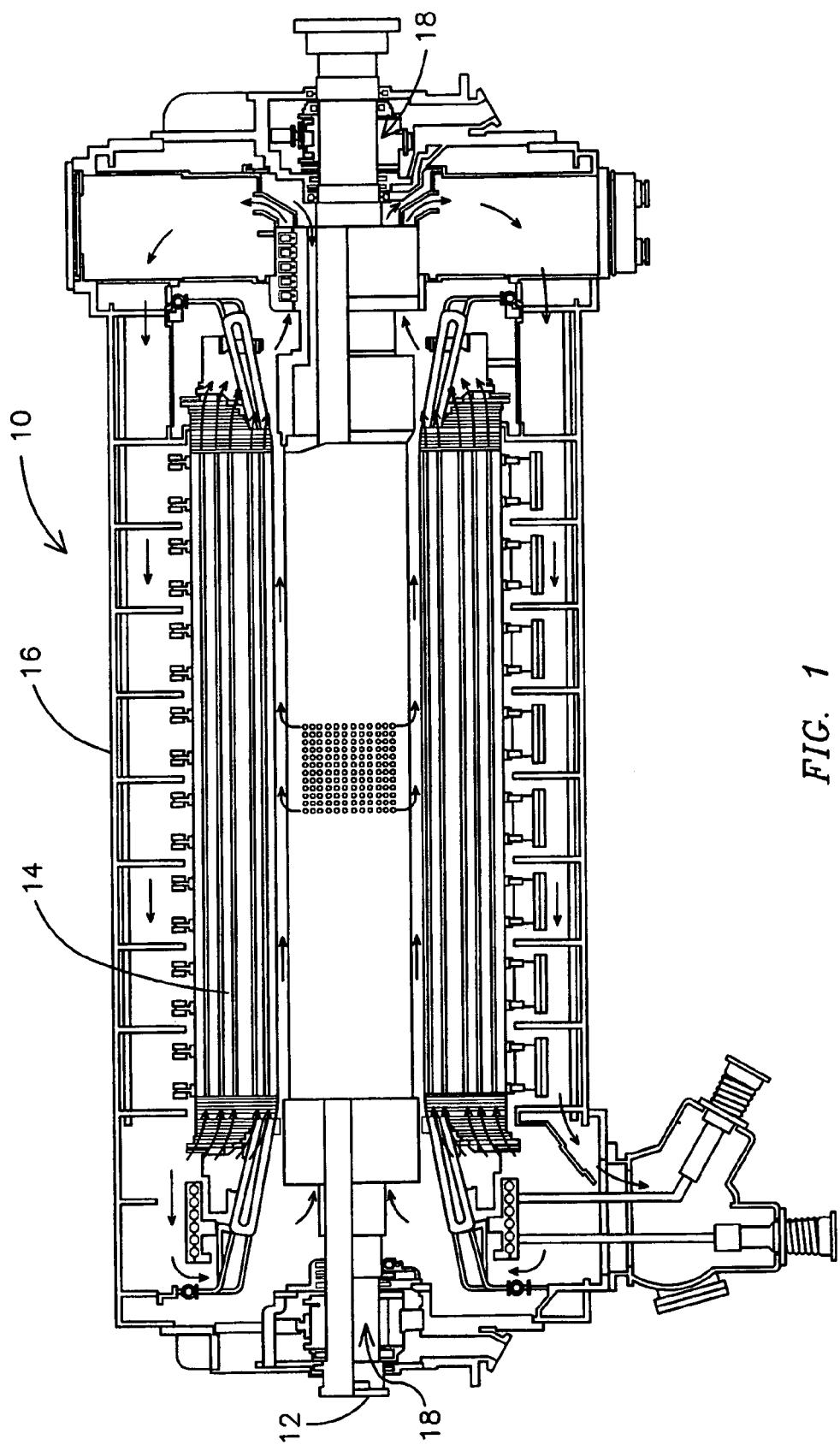
FIG. 1 illustrates an exemplary rotary machine for which methods and systems consistent with the present invention may be utilized.

FIG. 1 illustrates an example of a rotary machine that is suitable for use with methods and systems consistent with the present invention. The rotary machine illustrated in FIG. 1 is a conventional power generator 10 of the type used in the power generation industry. It should be understood that many other rotary machines, such as steam turbines and combustion turbines, are suitable for use with methods and systems consistent with the present invention. A power generator will be discussed merely to provide an exemplary context.

The power generator 10 illustrated in FIG. 1 includes a rotor 12 surrounded by a stator 14 and is enclosed by a housing 16. The rotor 12 and stator 14 are wound with electrical conductors. The rotor 12 is generally supported at each end by bearing assemblies 18. The rotor 12 spins inside of the stator 14 to produce electric power.

Figure 2A:
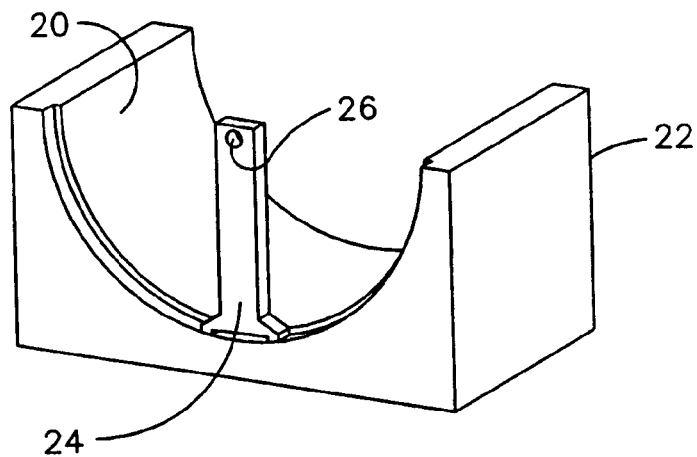
FIGS. 2A and 2B illustrate a centering tool consistent with an exemplary embodiment of the present invention.

Referring now to FIG. 2A, during the assembly or repair of a rotary machine, it may become necessary to locate a center with reference to two or more components 22 having cylindrical or semi-cylindrical surfaces 20. For the power generator illustrated in FIG. 1, for example, it may be necessary to locate a centerline with reference to the bearing assemblies 18 located at opposite ends of the rotary machine. In this case, the component part 22 is the bearing assembly 18 and the cylindrical surface 20 is the inner surface of the bearing assembly 18.

Methods and systems consistent with the present invention utilize one or more centering tools 24, like the one illustrated in FIG. 2A, to mark the center of the cylindrical surface 20. The centering tool 24 includes a light receiver 26 at one end, capable of receiving and detecting a columnar beam of light from a light source. The light receiver 26 is located on the centering tool 24 at a location such that when the opposite end of the centering tool 24 is positioned to abut the inside of a cylindrical surface 20, the center of the light receiver 26 is located at the center of the cylindrical surface 20. The centering tool 24 that will be placed closest to the light receiver 26 should include a light receiver of the pass-through type so that the columnar beam of light can pass through the first centering tool 24 to impact the second centering tool 24.

Figure 2B:
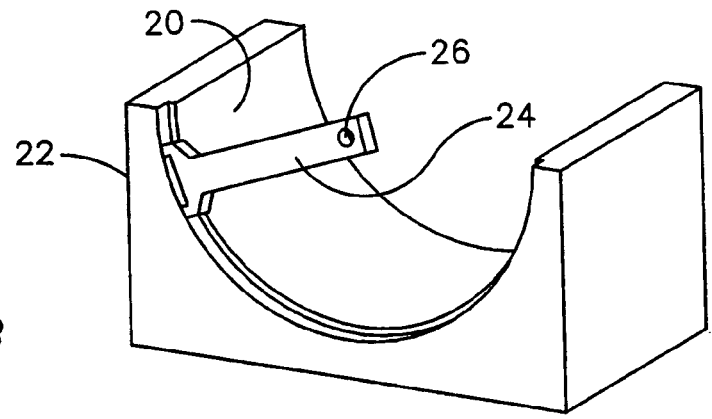

The opposite end of the centering tool 24 has a surface configured to rest and abut against the inside of a cylindrical surface 20. This end of the centering tool 24 may include permanent magnets, for example, to temporarily hold the centering tool 24 in place. In order to confirm the concentricity of a cylindrical surface 20, it may be desirable to move the centering tool 24 to various positions on the cylindrical surface 20 as illustrated in FIG. 2B. The exact dimensions of a centering tool 24 will vary depending on the dimensions of the component part 22 and cylindrical surface 20 being referenced to establish the centerline. Centering tools are preferably constructed in advance of a repair or assembly by using dimensions supplied by the manufacturer of the relevant component parts. The centering tools may then be stored until needed.

Figure 3:
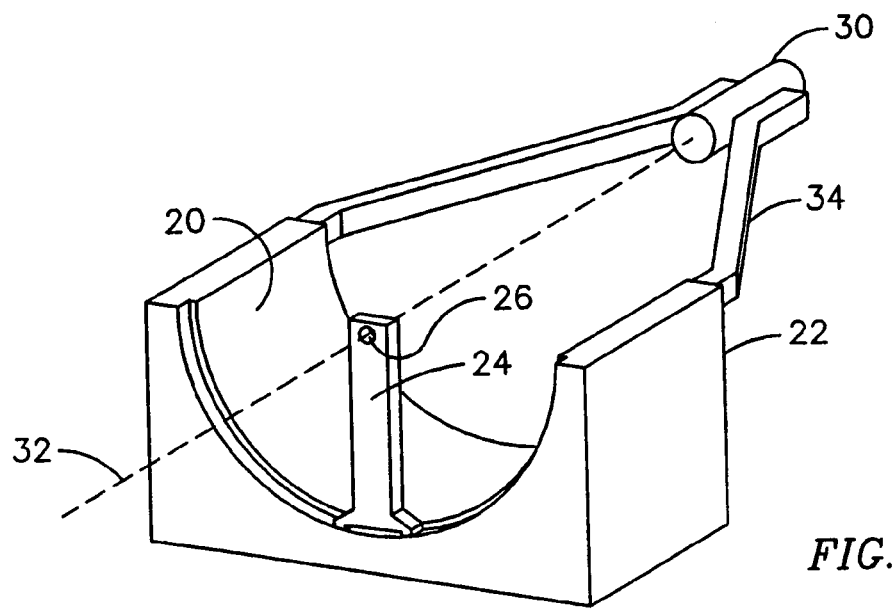
FIG. 3 illustrates a light source and support structure consistent with an exemplary embodiment of the present invention.

Referring now to FIG. 3, a light source 30, such as an eye-save laser emitter, in provided for emitting a columnar beam of light 32. The light source 30 is held in place at a location near the center of the bore of a cylindrical surface 20 at one end of the rotary machine by a support structure 34 or by a stable stand-alone fixture. The support structure 34 includes mechanisms for adjusting the vertical and horizontal position of the light source 30 and may also include mechanisms for dicing and rotating the light source 30. The mechanisms may be manually adjusted or may be automatically adjusted by linear and/or rotary actuators, such as a screw actuators and/or stepper motors.

Figure 4:
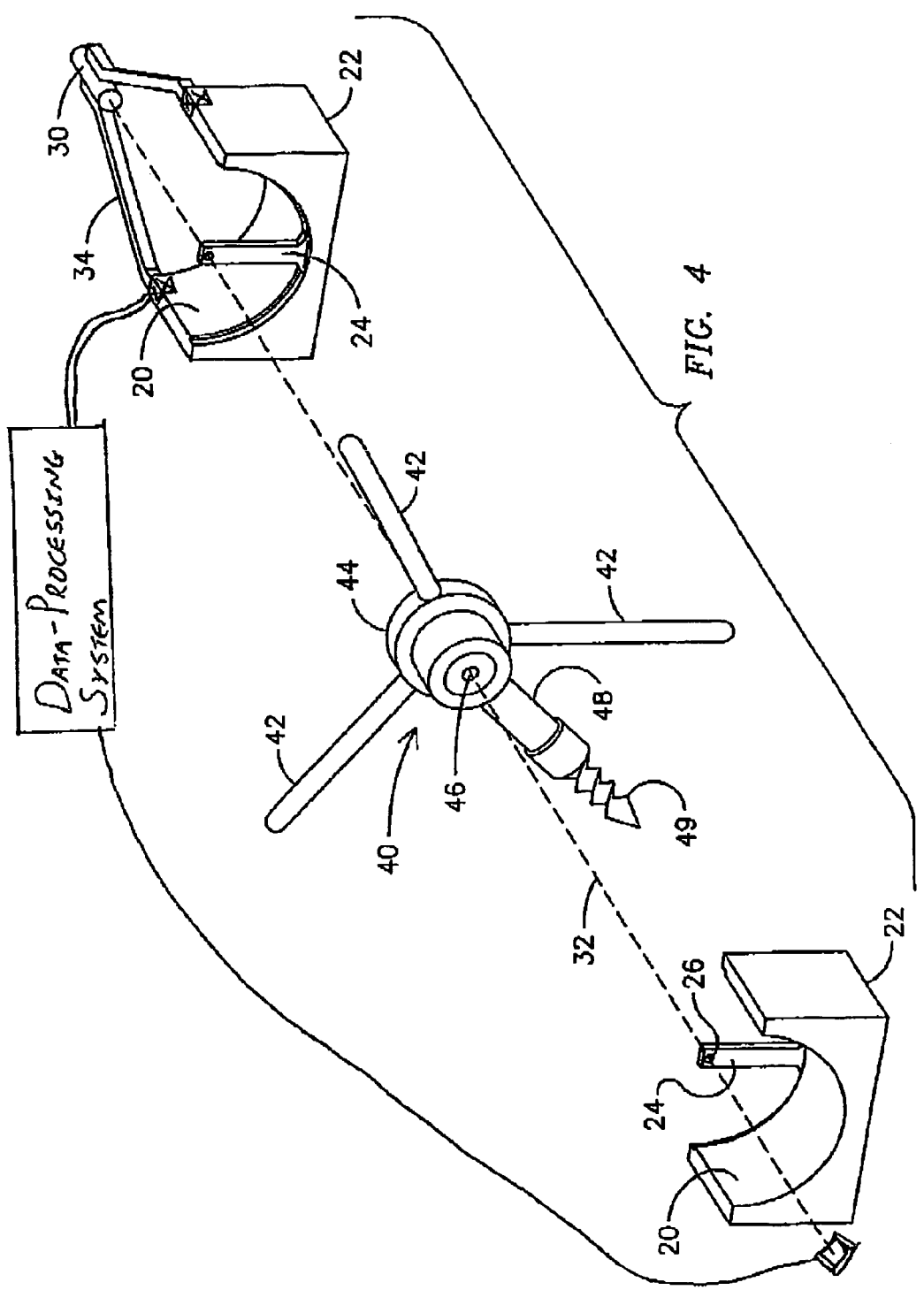
FIG. 4 illustrates a tool-support structure consistent with an exemplary embodiment of the present invention.
Figure 5:
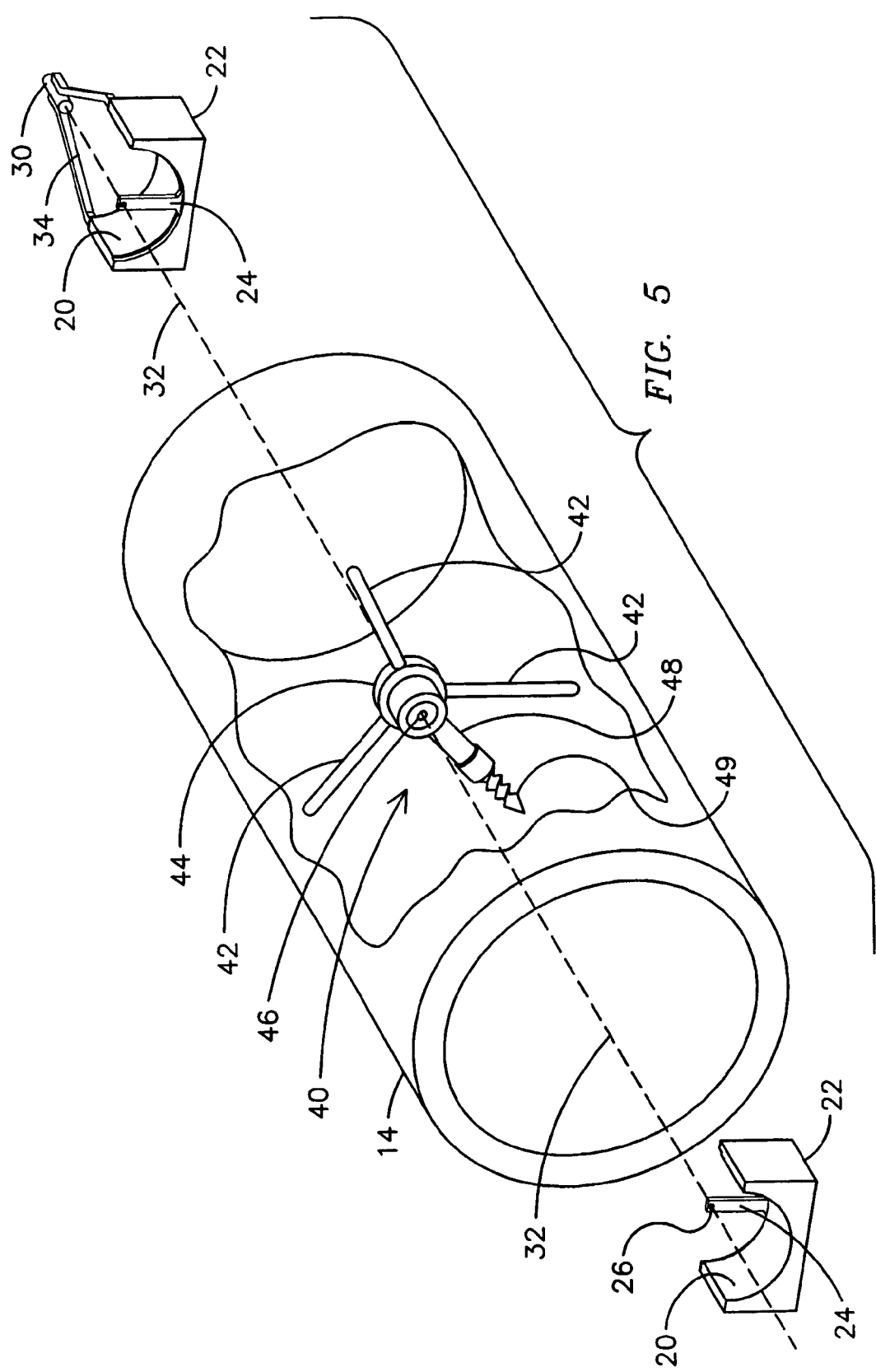
FIG. 5 illustrates a virtual-tight-wire system consistent with an exemplary embodiment of the present invention.

FIGS. 4 and 5 illustrate various components that combine to make up a virtual-tight-wire system consistent with an exemplary embodiment of the present invention. A centering tool 24 is positioned to abut against the cylindrical surface 20 of a component part 22 at each end of the rotary machine. A light beam 32 is emitted from the light source 30 and is aligned to impact the center of the light receiver 26 in each centering tool 24. Once the light beam 32 has been aligned, the centerline has been established and the light source 30 should be fixed in place. At this point the light source 30 may be turned off. When there is a need to reference the centerline, the light source 30 can simply be turned back on.

Virtual-tight-wire systems consistent with the present invention may also include a tool-support structure 40. An exemplary tool-support structure 40 is illustrated in FIGS. 4 and 5. The tool-support structure 40 may be used to facilitate precision machining and repair procedures that need to be performed within the interior of the rotary machine. The tool-support structure 40 includes a central portion 44 with a pass-through light receiver 46 for detecting and passing the beam of light 32 emitted by the light source 30. Three or more bracing arms 42 are provided around the central portion 44 to position and hold the central portion 44 in place. The bracing arms 42 may include transducers, such as LVDT transducers, for measuring the length of the bracing arms 42 and the relative position of the central portion 44. The tool-support structure 40 includes a tool-support arm 48, which attaches to and rotates about the central portion 44. The tool-support arm 48 is configured to support one or more tools 49 for performing machining or repair procedures within the rotary machine.

An exemplary method of establishing a centerline in a rotary machine using the virtual-tight-wire system illustrated in FIG. 5 will now be described. The light source 30 is positioned at one end of the rotary machine, near the center of a first reference cylindrical surface 20. A first centering tool 24 is placed on the first cylindrical surface 20. A second centering tool 24 is placed on a second cylindrical surface 20, which may be located, for example, at the opposite end of the rotary machine. A columnar beam of light 32 is then emitted from the light source 30 toward the first and second light receivers 26 in the first and second centering tools 24. The position of the light source 30 is adjusted until the light beam 32 passes through the centers of the first and second light receivers 26. Once the light beam 32 is aligned, the centerline with respect to the two cylindrical surfaces 20 is established. The position of the light source 30 is then fixed in place to provide a reference to the centerline.

The exemplary method may also include steps for utilizing the tool-support structure 40 for performing precise machining or repair operations in the interior of the rotary machine. The tool-support structure 40 is positioned within the rotary machine using the bracing arms 42. The position of the tool-support structure 40 is adjusted until the pass-through light receiver 46 pass the light beam 32 and the light beam 32 is centered within the light receiver 46. The tool-support structure 40 is then temporarily fixed in place. At this point the tool-support structure 40 has been precisely centered with respect to the established centerline and various machining or repair operations may be performed. The tool-support structure 40 may also include an adjustable tool-support arm 48 for position one or more tools 49.

The present invention has been described with reference to the accompanying drawings that illustrate preferred embodiments of the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. Thus, the scope of the invention should be determined based upon the appended claims and their legal equivalents, rather than the specific embodiments described above.

What is claimed is:

1. A system for establishing a centerline in a rotary machine relative to a first and second reference surface, comprising:

a light source for emitting a columnar beam of light;

a support structure for fixedly supporting said light source relative to said rotary machine;

a first centering tool having a pass-through light receiver disposed at one end of said centering tool at a position such that the center of said receiver lies at the center of said first reference surface when an opposite end of said centering tool is positioned to abut said first reference surface;

a second centering tool having a light receiver disposed at one end of said centering tool at a position such that the center of said receiver lies at the center of said second reference surface when an opposite end of said centering tool is positioned to abut said second reference surface; and an adjustment mechanism on said support structure for adjusting the position of said light source in at least a horizontal and vertical direction and for aligning said beam of light to impact the center of said light receivers in said first and second centering tool.

2. The system of claim 1 further including a tool-support structure comprising at least three bracing arms, a central portion having a pass-through light receiver, and a tool-support arm for fixedly supporting a tool.

3. The system of claim 2 wherein said bracing arms of said tool-support structure further comprise a transducer for indicating the position of said central portion.

4. The system of claim 1 further including a data-processing system and an automatic-adjustment mechanism for automatically adjusting said horizontal and vertical position of said light source until said beam of light passes through said light receivers of said first and second centering tool.

5. The system of claim 2 wherein said bracing arms are spring-loaded and comprise an extendable portion for altering the length of said bracing arms.

6. The system of claim 4 wherein said automatic-adjustment mechanism comprises a stepper motor in electronic communication with said data-processing system.

7. The system of claim 1 wherein said light source comprises a laser light emitter.

8. A system for establishing a centerline in a rotary machine relative to a first and second reference surface, comprising:

a light emitter means for emitting a columnar beam of light;

a support means for fixedly supporting said light emitter means relative to said rotary machine;

a first centering means having a pass-through light receiver disposed at one end of said centering means at a position such that the center of said receiver lies at the center of said first reference surface when an opposite end of said centering means is positioned to abut said first reference surface;

a second centering means having a light receiver disposed at one end of said centering means at a position such that the center of said receiver lies at the center of said second reference surface when an opposite end of said centering means is positioned to abut said second reference surface; and an adjustment means on said support structure for adjusting the position of said light emitter means in at least a horizontal and vertical direction and for aligning said beam of light to impact the center of said light receivers in said first and second centering means.

9. The system of claim 8 further including a tool-support means comprising at least three bracing arms, a central portion having a pass-through light receiver, and a tool-support arm for fixedly supporting a tool.

10. The system of claim 9 wherein said bracing arms of said tool-support means further comprise a transducer for indicating the position of said central portion.

11. The system of claim 8 further including a data-processing system and an automatic-adjustment means for automatically adjusting said horizontal and vertical position of said light emitter means until said beam of light passes through the center of said light receiver in said first and second centering means.

12. The system of claim 9 wherein said bracing arms are spring-loaded and comprise an extendable portion for altering the length of said bracing arms.

13. The system of claim 11 wherein said automatic-adjustment means comprises a stepper motor in electronic communication with said data-processing system.

14. The system of claim 8 wherein said light emitter means comprises an eye-safe laser light emitter.

15. A method for determining a centerline in a rotary machine, comprising the steps of:

positioning a light source at a first end of said rotary machine near the center of a first curved reference surface;

positioning a first and second centering tool on said first and second curved reference surface, said first and second centering tool having a light receiver at a distal end of said centering tool at a position such that the center of said light receiver corresponds with the center of said curved reference surfaces;

emitting a beam of light from said light source toward said first and second centering tools;

adjusting the position of said light source so that said beam passes through said center of said light receivers in said first and second centering tool; and fixing the position of said light source to indicate said centerline.

16. The method of claim 15 further comprising the steps of positioning a tool-support structure, comprising a central portion having a pass-through light receiver and a tool-support arm for fixedly supporting a tool, in a position such that said beam passes through the center of said light receiver of said tool-support structure;

positioning said tool by adjusting the position of said tool-support arm; and performing a tooling operation using said tool.

* * * * *